(12) United States Patent
Rossner

(10) Patent No.: US 8,915,599 B2
(45) Date of Patent: Dec. 23, 2014

(54) RETRO-REFLECTIVE MARKER

(71) Applicant: Ilumark GmbH, Feldkirchen (DE)

(72) Inventor: Holger-Claus Rossner, Feldkirchen (DE)

(73) Assignee: Ilumark GmbH, Feldkirchen (DE)

(*) Notice: Subject to any disclaimer, the term of this patent is extended or adjusted under 35 U.S.C. 154(b) by 0 days.

(21) Appl. No.: 14/190,145

(22) Filed: Feb. 26, 2014

(65) Prior Publication Data

US 2014/0177054 A1 Jun. 26, 2014

Related U.S. Application Data

(62) Division of application No. 13/318,598, filed as application No. PCT/EP2010/002660 on Apr. 30, 2010, now Pat. No. 8,662,683.

(30) Foreign Application Priority Data

May 6, 2009 (DE) .......................... 10 2009 019 986

(51) Int. Cl.
| | |
|---|---|
| *G02B 5/124* | (2006.01) |
| *G02B 5/122* | (2006.01) |
| *B29C 45/14* | (2006.01) |
| *B29D 11/00* | (2006.01) |
| *G02B 5/128* | (2006.01) |
| *B29L 11/00* | (2006.01) |

(52) U.S. Cl.
CPC .......... *G02B 5/122* (2013.01); *B29C 45/14262* (2013.01); *B29D 11/00605* (2013.01); *G02B 5/128* (2013.01); *B29L 2011/0083* (2013.01)

USPC .......................................................... 359/529

(58) Field of Classification Search
CPC ......... G02B 5/122; G02B 5/124; G02B 5/128
USPC ................................................ 359/529, 530
See application file for complete search history.

(56) References Cited

U.S. PATENT DOCUMENTS

| 3,365,790 A | 1/1968 | Brauer |
| 3,964,820 A | 6/1976 | Eigenmann |

(Continued)

FOREIGN PATENT DOCUMENTS

| DE | 2658743 A1 | 6/1978 |
| DE | 29604910 U1 | 7/1996 |

(Continued)

*Primary Examiner* — Euncha Cherry
(74) *Attorney, Agent, or Firm* — Alchemy-Partners, PC

(57) ABSTRACT

The present application relates to a reflector body (10), particularly a spherical retro-reflective marker, comprising a plurality of reflector body segments (11), and the individual reflector body segments (11) comprised by such a reflector body (10), and methods for producing the reflector body segments (11) and the reflector body (10). The reflector bodies (10) comprise a coating having a reflection film (12), by which the reflector body segments (11) of the reflector body (10) are uniformly spanned, performed by suitably selecting the geometric shape of the reflector body segment (11) to be spanned, by injecting molding behind the reflection film (12) in an injection molding process and/or by producing the reflector body segments (11) in a forming process.

5 Claims, 9 Drawing Sheets

(56) References Cited

U.S. PATENT DOCUMENTS

| | | |
|---|---|---|
| 3,971,692 A | 7/1976 | Anderson |
| 4,152,046 A | 5/1979 | Knapp |
| 4,265,938 A | 5/1981 | Jack et al. |
| 5,175,645 A | 12/1992 | Bennett et al. |
| 6,652,983 B1 | 11/2003 | Mori |
| 6,696,126 B1 | 2/2004 | Fischer et al. |
| 8,662,683 B2 * | 3/2014 | Rossner ........................ 359/529 |
| 2002/0075579 A1 | 6/2002 | Vasylyev et al. |
| 2003/0174401 A1 | 9/2003 | Brunner et al. |
| 2006/0073307 A1 | 4/2006 | Rossner et al. |
| 2007/0031641 A1 | 2/2007 | Frisch et al. |

FOREIGN PATENT DOCUMENTS

| | | |
|---|---|---|
| DE | 10029529 A1 | 6/2001 |
| DE | 60309702 T2 | 10/2007 |
| EP | 1639958 A1 | 3/2006 |
| EP | 1640750 A1 | 3/2006 |
| FR | 2706045 A1 | 12/1994 |
| JP | 58-011902 A | 1/1983 |
| JP | 5-329882 A1 | 12/1993 |
| JP | 2005-134437 A | 5/2005 |
| WO | 98/00737 A1 | 1/1998 |
| WO | 01/26574 A1 | 4/2001 |

\* cited by examiner

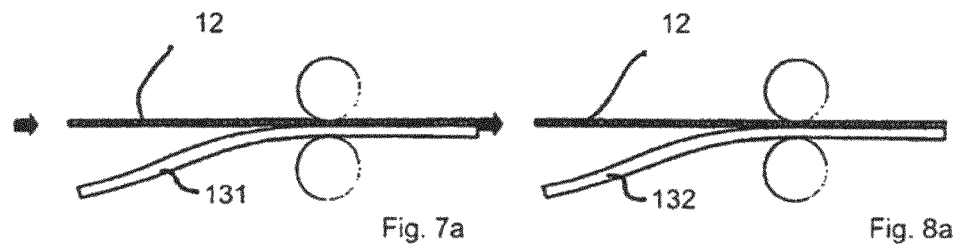
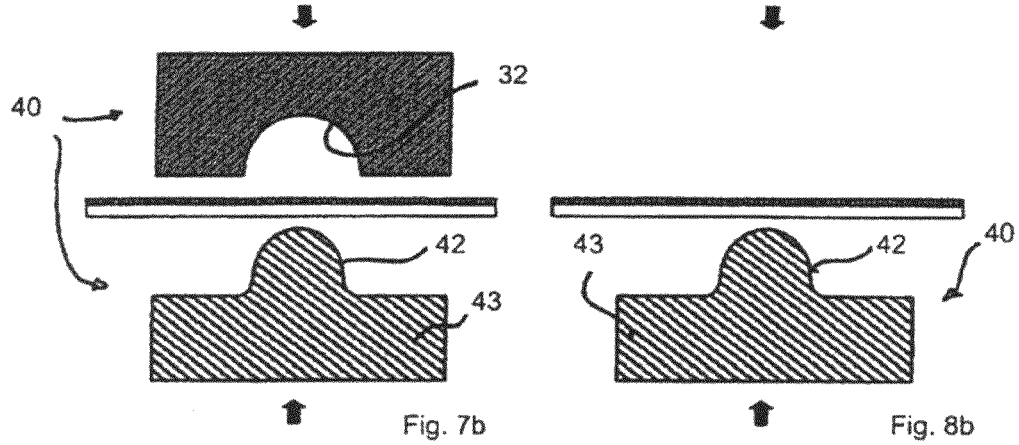
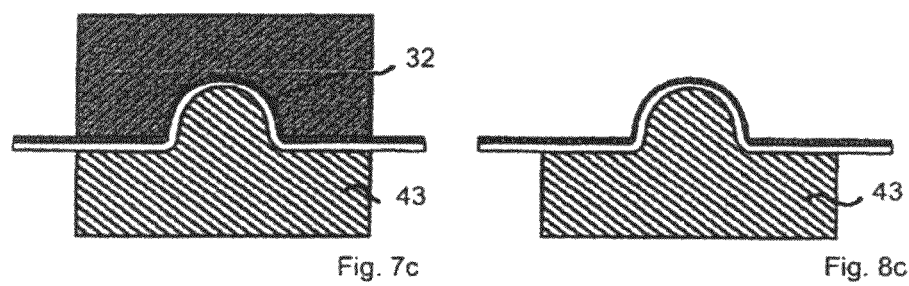
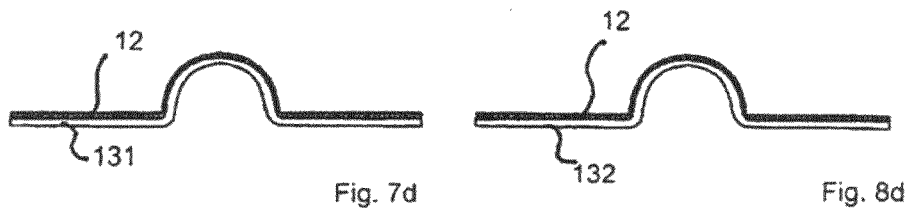

Stand der Technik

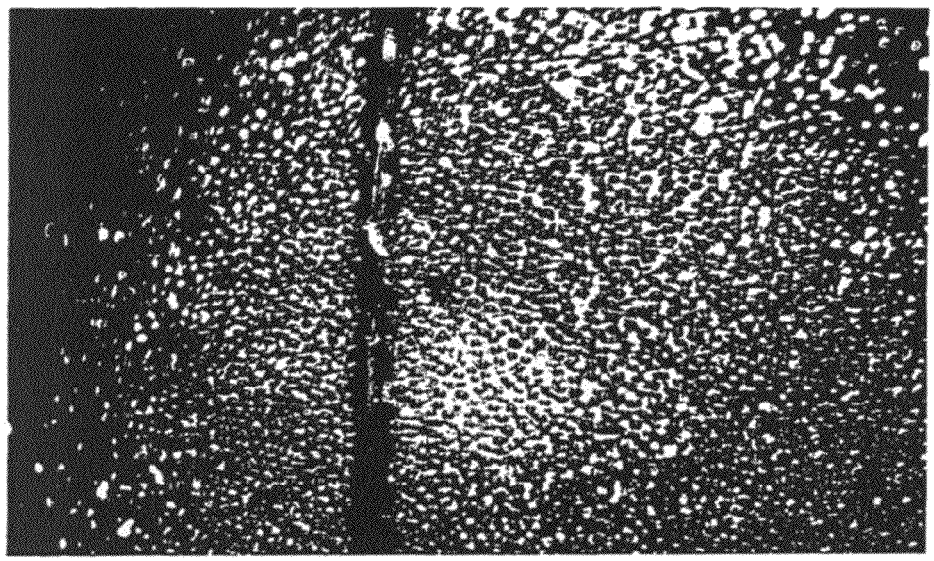
Stand der Technik  Fig. 10a
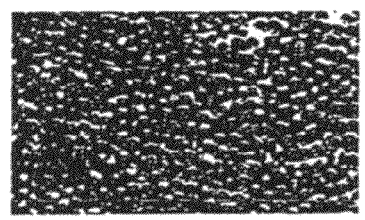
Stand der Technik
Fig. 10b
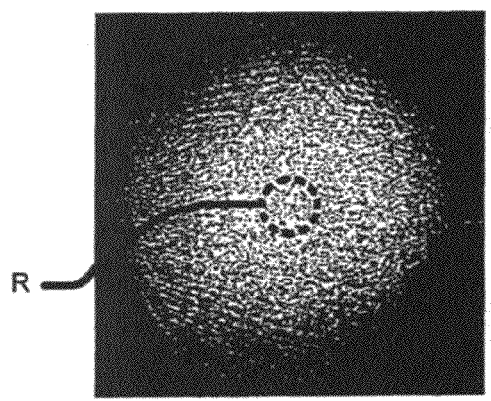 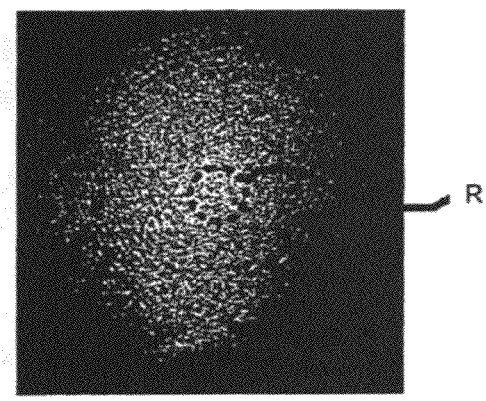
Stand der Technik  Fig. 10c   Stand der Technik  Fig. 10d Meßaufbau

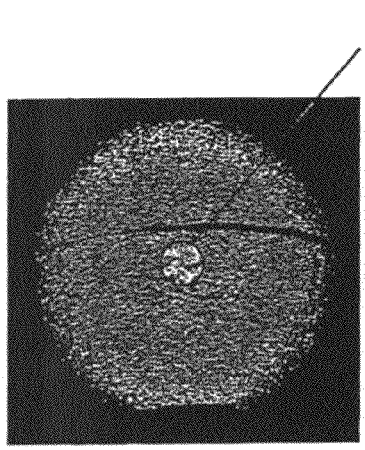
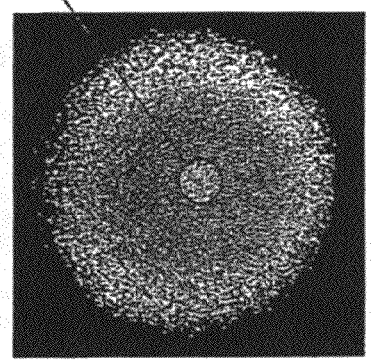
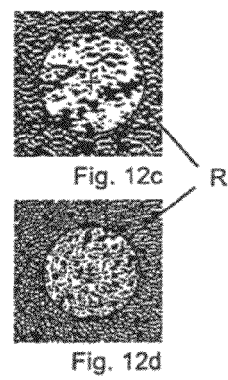
Fig. 12a  Fig. 12b  Fig. 12c
Fig. 12d
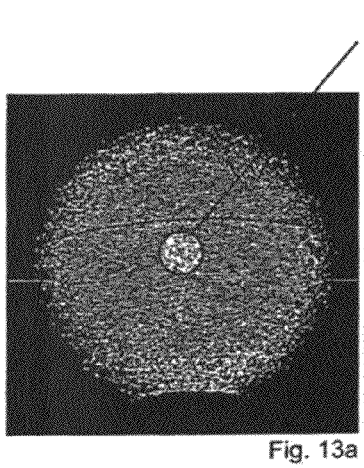
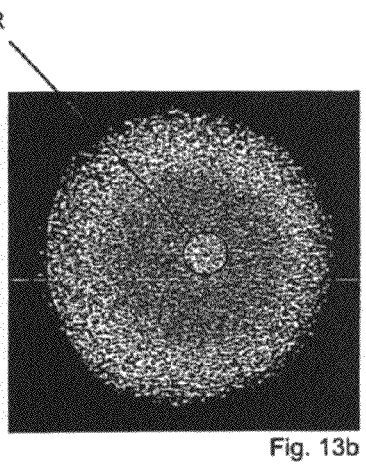
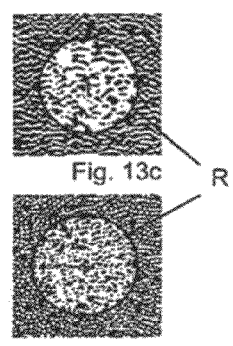
Fig. 13a  Fig. 13b  Fig. 13c
Fig. 13d

RETRO-REFLECTIVE MARKER

CROSS-REFERENCE TO RELATED APPLICATION

This is a divisional application of U.S. patent application Ser. No. 13/318,598, entitled "RETRO-REFLECTIVE MARKER," filed on Nov. 3, 2011, which is a 35 U.S.C. §371 National Stage Application of International Application No. PCT/EP2010/002660, entitled "RETRO-REFLECTIVE MARKER," filed Apr. 30, 2010, which claims priority to German Application No. DE 10 2009 019 986.1, entitled "RETRO-REFLECTIVE MARKER," filed May 6, 2009. The entire disclosure and contents of the above patents and applications are hereby incorporated by reference.

The present application relates to a reflector body, in particular a spherical retro-reflective marker, which has a plurality of reflector body segments, a reflector body segment for producing such a reflector body, and a method of producing the reflector body segment and the reflector body.

Among others, retro-reflective bodies are presently used in the fields of healthcare, film business and in the computer industry for various applications such as performing a three-dimensional position detection. In this connection, retro-reflective bodies are used as applications for image-supported surgery, for monitoring a movement in radio surgery, for optimizing a motion sequence for elite athletes, for so-called feedback motion sequences in rehabilitation, for recording motion sequences in the field of the so-called "motion capturing" and for localizing people and tools for "virtual reality" images.

Furthermore, applications of retro-reflective materials in road traffic are known. WO 98/00737 A1 describes a street pot having three strips with lenticular elements.

In contrast to a diffuse reflection from a surface, retro-reflection means that the reflected light rays are directly reflected back in the same direction, i.e. back to the light source, substantially parallel to the incident light rays. This is independent of the angle of incidence until a limiting angle is reached where the above-illustrated spheres cover each other.

In order to determine a position, the retro-reflective bodies are illuminated by a light source such as a conventional flash or an infrared flash ring, and reflect light in a very narrow range of angles with respect to the direction of incidence back to the light source. The illuminated scene can be filmed for example by a camera. Due to retro-reflection, the retro-reflective bodies have—similar to a light source—a much more intensive brightness in the recorded image than the non-reflective and darker environment. The retro-reflective bodies can therefore easily be isolated from surrounding objects and detected by software.

The retro-reflective bodies can be fixed at spatially fixed reference points and/or body parts and/or instruments or tools for example by a clamping or screwing device. When mounted on instruments or tools, the bodies follow the course of movement of the fixed bodies or of the instruments or tools.

By using film recordings, a motion sequence end/or a position of the tool with respect to the surroundings, in particular with respect to reference points, such as fixed reference points or reference points which are attached to body parts, can be recorded and calculated.

For example, when choosing a suitable line of sight, the position of an instrument with respect to a body part and/or a reference point can be determined unambiguously in three dimensions when at least three markers are arranged at the instrument in a fixed relationship.

Currently, both spheres and flat markers are used as retro-reflective bodies.

In general, flat markers are more accurate than marker spheres. This is due to the fact that retro-reflection films are used for producing spherical retro-reflective bodies. Known retro-reflective spherical bodies which are produced by using retro-reflection films show different reflection properties when illuminated from different directions, which is a disadvantage for determining a position.

One disadvantage of flat markers is, however, the strong limitation of the visible area when watching the scene from a lateral position. It is known to use a composite of four flat markers which are oriented under an angle to each other in order to combine the advantages of flat markers with the advantages of marker spheres. This requires, however, a much greater effort and results in significantly higher production costs.

Therefore, in most applications spherical retro-reflective bodies are used.

U.S. Pat. No. 3,964,820 describes a spherical retro-reflective element which retro-reflects a light ray when light is incident on its partially spherical surface portion. On the rest of the surface of this element, a plurality of concave and reflecting partially spherical small spheres is provided which reflect light rays which are incident on the partially spherical surface portion of the element and which are diffracted into the interior of the element.

U.S. Pat. No. 3,971,092 describes a retro-reflective material which is formed by a layer of transparent glass spheres on an adhesive coating formed on a carrier sheet wherein the exposed portions of the spheres are coated with a reflective material such as aluminum and the coated parts of the spheres are embedded in an adhesive coating of a component. Subsequently, the carrier film is removed together with the adhesive coating.

U.S. Pat. No. 4,265,938 describes retro-reflectors as used for road signs and license plates of vehicles. Here, the surface of a metallic substrate is retro-reflectively coated by applying a layer of an organic polymer and glass spheres and then by feeding the substrate through a roller where the glass spheres are covered with a crucible such that in the metallic surface of the spheres, depressions are generated.

FR 2 706 045 describes retro-reflective sheets and their production, the retro-reflective sheets especially being used for inspecting, measuring or observing a surface of an object. Here, a first reflective coating is applied to a metallic inner body of the sheet, and a second coating with glass spheres is applied to the surface of the first reflective coating.

EP 1 639 958 describes the production of a retro-reflective marker which is used in the medical field for surgery. A hollow sphere, preferably made of plastic, is coated with a retro-reflective layer which consists of a mixture of glass spheres, aluminum, gold or silver powder, by spraying or applying this mixture onto the sphere surface. The marker spheres can be attached to a support element.

WO 01/28574 describes a plastic sphere having a diameter of 10 mm to 15 mm to which a retro-reflective film is adhesively bonded.

DE 100 29 529 describes a reflector system for determining the position of instruments and devices, preferably for determining the position of a medical instrument or device in which the reflector consists of a transparent sphere which is either partially transparent or completely mirrored.

EP 1 640 750 describes a retro-reflective body and the production of such a body, which is especially used in the medical field for determining the position of surgical instruments. The body which has for example a spherical shape consists of a mixture of plastic and reflectively coated glass elements. The body is molded in an injection molding process. At the surface, the reflectively coated elements protrude from the plastic mass. The protruding coated elements and the reflective surface are separated by an etching process. A disadvantage of this process is that the coated glass elements are neither definitely oriented nor do they protrude uniformly from the plastic mass. Thus, the achievable retro-reflectivity as well as the homogeneous distribution of the retro-reflective glass elements is significantly lowered.

FIGS. 10a, 10b, 10c and 10d show various photographic images of a prior art spherical retro-reflective body where two hemispheres were covered with a film and then assembled. In the following, the assembling edge of the two halves running along a circular line will be referred to as the equator. The two points of the sphere which are intersected by a straight line which in turn runs perpendicularly to the equatorial plane through the center of the equatorial plane, are referred to as poles of the sphere. FIG. 10c shows the sphere from a viewing direction which is substantially perpendicular to one pole of the sphere. FIG. 10d shows the sphere from a viewing direction which is substantially perpendicular to a point in the equatorial region of the sphere. The two photographs were taken under identical conditions, i.e. at the same distance and with the same illumination of the sphere. The photographs clearly show that in the viewing direction as shown in FIG. 10c, the sphere reflects the light clearly better than in the viewing direction which the photograph in FIG. 10d is based on.

FIG. 10b shows a magnification of the sphere surface near one of the poles. FIG. 10a shows a magnification of a portion of the spherical surface near the equator. In these images, the exposure is adjusted to recognize the retro-reflective glass elements (micro-spheres) better. It is evident from these figures that the retro-reflective glass elements are closer to each other in the pole region than in the equatorial region which causes that in the viewing direction of FIG. 10c, the sphere reflects light better than in the viewing direction which lies in the equatorial plane.

In order to quantify the difference between the reflection properties, the average gray value of a surface area at the spheres can be determined. In order to avoid disturbing influences as for example a deterioration which is due to a viewing direction oblique with respect to the surface and which is caused by a shading effect, the gray values can be determined in a limited reference surface area R of equal size which includes a surface area substantially perpendicular to the viewing direction. The reference surface areas R chosen as examples and shown in FIGS. 10c and 10d are marked by dashed lines each. Given a spherical diameter of about 12 mm, the reference surface areas R may have a circular diameter of around 1.6 mm which approximately corresponds to a surface of the reference surface area of about 2 mm$^2$.

The gray value determined in each case can be determined for example by a CCD camera where the determined gray value of a pixel linearly depends on the amount of incident light such that by comparing the determined gray values, the precise ratio of the reflection properties is evident. In the example shown in FIGS. 10c and 10d, the retro-reflective body showed a relative difference reflection with respect to the selected reference surface areas R of 70%. This means that in a viewing direction towards the spherical retro-reflective body which is shown in FIG. 10d, the spherical retro-reflective body reflects no more than 70% of the light compared to the viewing direction of FIG. 10c.

It is apparent from this that an important criterion for the quality of markers is the CIL (value of beck reflection) reached, which can also be expressed in cd/lux/m$^2$ (candela per lux per square meter). Depending on the application, the CIL should be above 300 cd/lux/m$^2$. Preferably, the CIL should constantly be achieved over the whole retro-reflective surface such that the markers show a consistent reflection behavior regardless of the viewing direction in space. In many applications such as medical applications for positioning surgical instruments and devices, a lateral viewing angle with respect to the marker is desired, the angle being as large a possible.

Ways for determining the quantitative retro-reflection of a surface to be evaluated are described in the CIE standard 054.2-2001. CIE is an abbreviation for the International Commission on illumination (in French "Commission Internationale de l'Eclairage"). The CIE was founded at the beginning of the 20th century. The organization is recognized by ISO as an international standardization body. Furthermore, various systems are available on the market for a standardized measurement of retro-refection where usually digital images of the surfaces to be evaluated are taken under specific lighting conditions in the systems. Then, using software an average brightness (for example a gray value) of a surface area of the surfaces to be evaluated is determined from the digital images. Finally, the reflection properties of the surface area are quantified based on the average brightness.

Systems available on the market are generally intended for determining the reflection of larger areas such as traffic signs. Therefore those systems eventually are not suitable for measuring smaller bodies.

In the following with reference to FIG. 11, a measurement system will be described with which relevant reflection properties of small reflector bodies, especially of spherical retro-reflective markers can be determined. The measurement system shown in FIG. 11 has been further developed compared to the system which with the images of figure series 10 were taken. Using the measurement system of FIG. 11, those pictures were taken which are illustrated in figure series 12 and 13. The corresponding measurements were based on the CIE standard 054.2-2001.

The measurement system shown in FIG. 11 comprises a high resolution CCD camera 4 with a telecentric lens 3 having a coaxial illumination unit. In the measurement system, the measurement object 1 is fixed at a fixedly mounted socket 2. In case of evaluating spherical retro-reflective markers, the markers are fixed in the measurement system such that the center of the sphere lies on the optical axis of the telecentric lens 3. The spherical marker can be arranged rotatably around the center of the sphere. Then the measurement object 1 is illuminated by the illumination unit 3 and recorded by the CCD camera 4. The recording can be evaluated for example by a so-called machine vision software in real time or later by using image processing programs.

In the measurements carried out on the reflector bodies of figure series 12 and 13, a circular measurement point was defined as a reference surface area R using a diameter in each case. The reference surface area R has a diameter equal to about one-eighth of the diameter of the marker.

Figure series 12 represents photographs and excerpts from photographs with which using the described measurement system, a marker was measured which was available on the market during the priority interval of the present application.

FIG. 12a shows a photograph of the marker, where the recording direction was directed to an equatorial area of the marker. In FIG. 12a, the equator itself is shown as a relatively dark and thus poorly reflective line. This equator line is formed by the assembling area of the two hemispheres which has no retro-reflective surface due to production tolerances. In the illustrated photograph, the optical axis of the CCD camera 4 with the telecentric lens 3—the axis directed to the spherical center of the marker—intersects the spherical surface in the equatorial area slightly off the equator, wherein the reference surface area was selected adjacent to the equator line such that the equator line does not intersect the reference surface area in order to avoid a wrong measurement result due to the non-reflective areas of the equator line.

In figure series 12, the reference surface area is shown as a circular area which is shown with increased brightness compared to the rest of the sphere surface. This increased brightness does not correspond to reel recordings, but has subsequently been integrated into the photographs for purposes of illustration, i.e. to graphically highlight the reference surface area. The measurements, however, were based on the unaltered recordings without said increased brightness.

As mentioned above, the diameter of the reference surface area corresponds to about one-eighth of the sphere diameter. This selection of the diameter reduces influences on the reflection properties due to surface curvature to an extent that they are negligible.

FIG. 12b shows a photograph of the marker, where the recording direction was directed to a pole region of the marker.

FIG. 12c shows an enlarged area of the reference surface area from FIG. 12a. FIG. 12d shows an enlarged area of the reference surface area of FIG. 12b.

The brightness values of the reference surface areas from figure series 12 were determined. It was determined that the CIL in $cd/lux/m^2$ of the reference surface area in the equatorial region was in some cases more than 30% below the CIL in $cd/lux/m^2$ of the reference surface area measured in the pole region. Therefore, the relative difference reflection was less than 70%.

Figure series 13 shows an improved reflector body which was recorded under identical measurement conditions and which is described in detail below in the description of the figures.

OBJECT OF THE INVENTION

Based on the aforementioned prior art, the object of the invention is to provide a reflector body and intermediate products for producing a reflector body aid a method of producing the reflector body where the reflector body has—when viewed from different directions—a homogenous retro-reflective surface with a good CIL and is an easy-to-produce low cost product.
Solution The object is achieved by the subject matter and methods of the independent claims. Advantageous embodiments and modifications are described in the dependent claims.

A first aspect relates to a reflector body, in particular a spherical retro-reflective marker which has at least three reflector body segments, wherein each reflector body segment has a coating which comprises a reflection film.

A reflector body of this type may be composed of three or more reflector body segments. The reflector body segments carrying the coating may be joined to each other in a detachable manner or in a non-detachable manner such as by welding, especially ultrasonic welding, by bonding, form-fitting or friction-fitting or in a different manner such that the individual reflector body segments have a substantially continuous reflection surface. The reflection surfaces of the reflector body segments can together form a reflection surface of the reflector body which has a three-dimensional curved surface profile, in particular a spherical shape. "Coating which comprises a reflection film" in this context describes a coating which is used when producing the reflector body by using a reflection film. The reflection film may be applied to a segment base body. The segment base body may be preformed. In addition to the actual reflection film, the coating may comprise more layers such as an adhesive layer, protective layers or the like. Furthermore, for example a primary carrier layer may be provided. Note that there is a difference between the terms "carrier material" and "primary carrier layer". In the present description, the carrier material is the part of the reflection film which is flexible like a film. The term "primary carrier layer", however, refers to a separate layer to which the reflection film may be applied. The primary carrier layer may substantially be formed as a self-supporting, i.e. rigid layer to which the reflection film with the carrier material may be applied. The primary carrier layer may for example be a separately preformed primary carrier layer which subsequently is covered with the reflection film. It is also conceivable that such a primary carrier layer is at first coated with the reflection film end then formed together with the reflection film. The primary carrier layer may comprise a substantially rigid layer such as one of a polymer material. The term "coating which comprises a reflection film" describes various types of "coatings" with reflection films that can be produced by using different producing process as for example by injection molding behind a reflection film, as is described below in connection with other aspects. It is also conceivable to apply for example self-adhesive reflection films to reflector body segment blanks which are present in rigid form. A coating may either be produced by applying a reflection film to a solid body and by producing a solid body behind the film such as by injection molding, blow molding and the like. Reflection films are available in various models from various producers on the market as for example under the trade name Scotchlite from 3M. Reflection films can for example comprise textile carrier materials, carrier materials of a homogenous layer (for example of a polymer film) or of other carrier materials. Reflection films can be made self-adhesive. On the carrier material, here may be provided reflector elements such as so-called micro-spheres. Micro-spheres are reflector spheres which are made of a transparent material and which on one side have a reflective layer. Furthermore, reflection films are conceivable where the reflector elements are directly incorporated into the reflection film such as in the form of triple mirrors, prismatic retro-reflective depressions or the like.

In the unwound state of the reflection film, the reflection film with which the reflector body segment of the first aspect is coated, may have a substantially planar form, i.e. It does not show any stretching in the film plane. During the coating of the reflector body segment, the refection film is deformed, beginning with said planar shape and ending with a three-dimensionally curved shape, the reflection film being stretched or elongated. The more the reflection surface of the reflector body segment differs from the planar form, the more the reflection film must be stretched in certain areas. When stretching the reflection film, the reflector elements which are distributed on the reflection film separate from each other such that due to a reduced reflector element density on the reflection film, the reflection properties of the reflector body may deteriorate in this area. Here, when covering the reflection film in different areas of the reflector body segment, a different stretching can occur such that the reflector body segment has different reflection properties in different areas. It was recognized that during the coating process, stretching especially occurs in the peripheral areas of the reflector body segment whereby the reflector body may show reduced reflection properties near the reflector body segment boundaries which may result in an inhomogeneous reflection behavior of the reflector body. These unwanted effects can be reduced with a reflector body according to the first aspect because during the production process, each of the at least three reflector body segments shows a lower elongation of the reflection film as this is the case when producing a hemisphere. In a reflector body produced in this way, the reflection film shows therefore a lower stretching or elongation especially in the peripheral areas of the reflection surfaces of the reflector body segments as compared to the central regions.

In one configuration of the reflector body according to the first aspect, the reflection surfaces of each of the reflector body segments of the reflector body may be configured such that the reflection film when applied to the reflector body segment is stretched in no reference surface areas of the reflector body segment beyond a particular absolute reference strain and/or beyond a particular relative reference strain. When stretching the reflection film, a locally different strain can occur in micro-areas of the reflection film. Such local differences do not play any role when using the reflector bodies and can therefore be ignored. Therefore, for the quantification of the reference strain, a limited reference surface area of the reflector body segment is defined. In this case, a strain can be determined via a comparison of reference values of different reflection surface areas. The term "absolute reference strain" in this context means a strain of a reference surface area of the reflector body segment compared to the unstretched reflection film. "Relative reference strain" refers to a strain of a reference surface a of the reflector body segment compared to any other reference surface area of the reflector body segment. For example, as a reference surface area a circular surface area with an area of 2 mm$^2$ can be defined.

The reflection properties of a reflection film can quasi-linearly be correlated to the surface-related strain of the reflection film, if effects as damaging the film or shading the micro-spheres by obliquely incident light—which is caused by neighboring micro-spheres—are ignored. If a film is for example stretched to twice of its area, a specific surface of the stretched film can retro-reflect not more than half the light compared to a specific surface area of the unstretched film.

Within a reference surface area on the reflector body segment, the average reflection can be determined and compared to the reflection of a reference surface area of a flat and non-deformed refection film or to the reflection of another reference surface area on the reflector body segment. The determination of the average reflection can for example be performed by means of a photographic recording of the reference surface area wherein from this photographic recording, an average gray value can be determined in the reference surface area. When recording different reference surface areas having an approximately collinear illumination and under essentially identical conditions, the measured gray values can be compared to each other.

In order to determine the reflection, the reference surface area is chosen in a region of the reflector body segment in which the incident light is substantially perpendicular to the reflection surface, in order to eliminate or at least reduce possible influences such as shading.

By comparing the reflection of the reference surface area on the reflector body segment to the reflection of a reference surface area on the undeformed reflection film, a value of an absolute difference reflection can be determined. By comparing the reflection of the reference surface area on the reflector body segment to the reflection of another reference surface area on the reflector body segment, a value of a relative difference reflection can be determined.

In a reflector body according to the first aspect, an absolute value of the difference reflection can be achieved which at any point of the reflection surface of the reflector body is significantly above the absolute value of the difference reflection which can be achieved when covering hemispheres. When covering hemispheres, the absolute value of the difference reflection—taking an average over the entire hemisphere surface—can be about 50%, as a circular area of the undeformed film with the diameter of the finished sphere has to cover one half of the sphere which means that it would have to be stretched to twice of its area. Since the stretching is unlikely to be equal in all areas, some areas may have an absolute difference refection of less than 50% and may therefore reflect less than 50% of the light compared to an undeformed film. When coating reflector body segments with a smaller sub-area of a spherical surface according to the first aspect, the required elongation can be reduced significantly such that reflector bodies can be provided which in no region of the reflection surface have an absolute difference reflection of less than 55% or even a difference reflection of 60% or 65%.

The value of the relative difference reflection can be significantly improved as well. According to the first aspect, for example reflector bodies can be provided where no reference surface area compared to any other reference surface area has a relative difference reflection of less than 85%. The most weekly reflective areas can thus still reach a difference reflection value of 85% with respect to the best reflective area. Depending on the design of the reflector body segments, difference reflection values of 90% and more can be obtained as well.

In one embodiment of such a body reflector, the reflector body may have a substantially spherical refection surface.

"A substantially spherical reflection surface" in this context means a surface shape which differs from the mathematically ideal spherical shape only within conventional producing tolerances. Furthermore, such a reflector body may have an adapter receptacle which is why the spherical shape of the reflection surface is not given near the adapter receptacle. A reflector body with an adapter receptacle is to be considered as a reflector body having a substantially spherical reflection surface as well.

In another embodiment of such a reflector body, the reflector body may have two hemispherical elements, wherein one hemispherical element has at least one reflector body segment and the other hemispherical element has at least two reflector body segments.

It is conceivable for example that such a reflector body for example has two hemispherical elements, each of which is made up of exactly two or exactly three reflector body segments. These embodiments represent a compromise between a small number of parts and a low surface curvature of the individual reflector body segments resulting only in a slight stretching of the reflection film on the reflector body segments.

According to still another embodiment of such a reflector body, the reflector body may have a sphere segment-shaped base segment with an adapter receptacle, wherein the base segment comprise at least one reflector body segment and wherein the reflector body further comprises at least two other reflector body segments which together with the sphere segment-shaped base segment form a spherical shape.

Here, the spherical segment surface of the base segment may have a smaller reflection surface area than a hemisphere. The base segment may have a spherical segment shape which substantially corresponds to the smaller spherical segment which is formed by an eccentric section of a plane with a sphere. The adapter receptacle can centrally be located in this sphere segment. The other reflector body segments differ from the base segment and can essentially be identical to each other. Basically, in addition to the base segment two, three, four or n additional reflector body segments may be provided. If such a reflector body in addition to the basic segment comprises exactly three reflector body segments, on the one hand, the number of parts and thus the number of abutting edges between reflector body segments can be kept low and on the other hand, the reflector body segments may be designed such that only a slight stretching occurs in the reflection film.

In another embodiment of such a reflector body, the reflector body segments are connected to each other by form-fitting and/or by friction-fitting and/or by bonding and/or by welding.

A form-fitting can for example be provided in the form of a clip closure. A clip closure can be formed as a non-destructive and non-detachable clip closure. A combination of different connection types is conceivable as well. For example at first, two or more reflector body segments may be bonded together and then, the base segment may be clipped. Other embodiments are also conceivable. Other design options and examples of reflector bodies are based on the following remarks concerning other aspects.

A second aspect relates to a method of producing a reflector body segment, in particular a reflector body segment for the production of a spherical retro-reflective reflector body in an injection molding process, comprising the steps of:
  providing an injection mold with a contact element, which has a contact surface, which defines a cavity of the injection mold in an area, and an injection orifice,
  providing a reflection film in the cavity between the injection orifice and the contact surface, and
  injection molding behind the reflection film by injecting a molding material through the injection orifice into the cavity.

A reflector body segment produced in this way can together with additional reflector body segments form a reflector body, in particular a spherical retro-reflective marker. In particular, the method is suitable for producing reflector body segments for a reflector body according to the first aspect. The method is, however, suitable for producing other, for example hemispherical, reflector body segments for other markers as well. It is also conceivable that a reflector body segment produced in this way is used without further segments as an single-piece marker with only one segment.

Cavity means the forming space within the injection mold into which the molding material is injected. The injection mold can comprise various parts movable with respect to each other, each having different wall surfaces. The cavity can be defined based on various such wall surfaces. Opening the mold by moving apart the various movable parts allows ejecting the injection-molded part. The wall surfaces of the movable parts essentially comprise a negative surface shape corresponding to the positive surface shape of the reflector body segment produced by injection molding. One of the movable parts, i.e. the contact element, can have a wall surface or a portion of the wall surface which is referred to as contact surface here. The entire contact surface can be defined as a continuous surface through the wall surface of a single contact element. It is also conceivable that several contact elements are provided which have wall surfaces that form the contact surface together. The contact area as an area of the wall surfaces of the injection mold can essentially be made and provided in a way that the contact surface corresponds to the reflective component of the surface of the reflector body segment to be produced, i.e. to the reflection surface of the reflector body segment or comprises the reflection surface. The contact surface and thus essentially the reflection surface of the reflector body segment can be made flat or three-dimensionally curved. If a reflector body segment is to be generated to produce a spherical retro-reflective marker, the contact surface or a part of the contact surface may have the surface shape of a negative spherical surface segment, for example a hemisphere. Other possible surface forms can be derived from the above argumentation relating to the first aspect and dealing with possible designs of the reflector body segments.

By using the described method, reflection films may be used which have no adhesive backing. By using this method, a coating step of the reflector body segments can be avoided. By this, the producing process of retro-reflective markers is simplified. Due to high pressures in the injection molding process, the generated shape of the reflector body segment in particular the reflection surface of the reflector body segment, may be adapted to the desired surface shape within low tolerances. It has surprisingly been shown that the reflection properties of reflection films which are available on the market and which are considered as sensitive, due to mechanical and thermal stresses during the injection molding process do not deteriorate at al or at least only slightly.

By injection molding for example, a segment base body of the reflector body segment can be generated behind the reflection film which combines with the reflection film. Initially raised objections concerning excessive thermal stresses of the carrier material of the reflection film which would have resulted in a non-uniform strain or a melt-through of the reflection film, have proved as unfounded, contrary to expectations. Therefore, injection molding can be performed by injecting a molding material through one or more injection orifices directly behind the reflection film in its still undeformed and flat state. Another advantage of this method is that it is not necessary to deform the reflection film which is provided in the cavity, by contacting the film with a solid forming body and pushing the solid body into the film. Instead, the reflection film may for example be formed by injecting a liquid injection molding material or by blowing in compressed air and the like. By doing so, during the deformation of the reflection film, no laterally acting frictional forces with respect to the solid body occur. Such laterally acting friction forces may in conventional methods when pushing the sold body into the film along the pushing way result in different stresses in the film and thus in different amounts of strain in the nm. When deforming the reflection film by injecting the molding material or by blowing in compressed air before the injection step, a uniform pressure, however, can be applied to the film over the entire surface of the reflection film inside the cavity such that different areas substantially stretch uniformly. A reflector body segment produced with this method shows therefore in different regions of is reflection surface a more uniform stretching or elongation of the reflection film compared to conventional markers and shows thus an improved reflection behavior.

According to the second aspect, for example reflector body segments may be produced where no reference surface ara has—compared to any other reference surface area—a relative difference reflection of less than 85%. The mast weakly reflective areas can thus still reach a difference reflection value of 85% with respect to the most reflective area. Depending on the design of the reflector body segments, difference reflection values of 85%, 88%, 91% or even difference reflection values above these values can be obtained.

According to a modification of this method, the step of providing an injection mold with a contact element which has a contact surface can comprise the stop of providing the contact element with a rounded edge in the peripheral area of the contact surface.

By this, a damage to or a tearing of the reflection film is prevented, and/or a smooth gliding of the reflection film into the cavity is allowed. In one embodiment of the process, the rounding may have a radius of curvature of the edge of at least 10 mm.

According to another modification of this method, the step of providing an injection mold with a contact element may also comprise providing an edge element with a rounded edge, wherein the edge element is provided in the peripheral area of the contact surface of the contact element and is movable with respect to the contact element.

The edge element may be positioned behind the reflection film in the injection direction. By this step as well by providing the rounded edge, damaging or tearing of the reflection film can be prevented and/or a smooth supplying of the reflection film into the cavity is enabled. In one embodiment of the method, the rounding may have a radius of curvature of the edge of at least 10 mm. By providing the movable edge element, the edge element can be removed from the peripheral area for example after the end of the injection process such that ejecting the reflector body segment from the mold is enabled or facilitated. Removing the edge element from the peripheral area may be performed by laterally pulling apart an edge element consisting of the two or more components or by lifting off the edge element from the contact element. In the latter case, the edge element may be provided as a single-piece component as well. By lifting off the edge element, that part of the reflection film which is suspended from the reflection body segment outside the reflection surface, can be torn off such that an additional production step of cutting off the reflection film is superfluous.

According to one further modification of the method, the step of providing an injection mold with a movable edge element may be performed such that the edge element is movable between an injection position and an ejection position, wherein in the injection position, the peripheral area of the contact surface is at least partly covered by the edge element in the form of an undercut and wherein in the ejection position, the peripheral area of the contact surface is free from overlaps by the edge element, wherein the method further comprises the steps of.

providing or transporting the edge element in the injection position prior to the step of injecting the molding material, transporting the edge element into a discharge position after the step of injecting the molding material (301) and ejecting the reflector body segment.

According to one further modification of the method, prior to the step of injecting the molding material, it may be performed the step of:

applying pressure to the injection side of the reflection film such that the reflection film curves in the direction of the contact surface.

Applying pressure on the injection side of the reflection film may be performed either by increasing the pressure on the injection side, for example by blowing in compressed air on the injection side, or by reducing the pressure on the contact side, for example by sucking off the air on this side. Reducing the pressure on the contact side may be realized by providing suction ducts in the injection mold and/or by providing a contact surface of the injection mold or areas of the contact surface made of a porous or micro-porous material having pores of a size which does not adversely affect the surface properties of the reflector body segment, which, however, are large enough that air may be sucked off through the pores. Applying pressure on the injection side of the reflection film may be performed such that the reflection film is curved prior to injection or fully brought into contact with the contact surface. The pressure in the cavity may be maintained until the beginning or the end of the injection molding step.

According to one modification of the method, the step of providing a reflection film in the cavity is performed such that the reflection film is provided with areas of different yield strengths.

When curving the reflection film from the flat state in the direction of the contact surface, for example when pressure is applied on the injection side of the reflection film during the injection molding process, in different areas of the reflection film different tensions may be generated which may lead to different stretchings or elongations of the reflection film in different areas. This effect may be reduced or compensated for by providing the reflection film with areas of different yield strengths. To this end, a reflection film may be used with a carrier material which has different material thicknesses and therefore areas of different yield strengths. It is also conceivable that the reflection film is applied onto a primary carrier layer in a further step prior to injection molding. In the present case, the terms "carrier material" and "primary carrier layer" differ from each other. The carrier material is a part of the reflection film and is thus flexible. The term "primary canter layer", however, refers to a separate layer to which the reflection film may be applied. The primary carrier layer may substantially be formed as a self-supporting and rigid layer onto which the reflection film with the carrier material can be applied. Such a primary carrier layer to which the reflection film is applied, may for example be a PVC layer (layer of polyvinyl chloride) with a thickness of 0.2 mm to 4 mm. The primary carrier layer may also consist of a different material. A primary carrier layer onto which the reflection film is applied, may also be a carrier layer which is used in a process which is described below with reference to the third aspect and which is injection molded in the injection molding process according to the second aspect. The primary carrier layer can heave areas of different yield strengths such that the composite with the reflection film likewise has regions with different yield strengths. Areas of different yield strengths of the primary carrier layer may, as has previously been described with respect to the carrier material, be generated by different material thicknesses of the primary carrier layer. It is also possible that areas of different yield strengths may be generated by combining different material thicknesses of the primary carrier layer and the carrier material.

One further modification of the method can further comprise the step of fixing the reflection film circumferentially around the contact surface such that material of the reflection film from outside the peripheral area of the contact surface may flow into the area within the peripheral area of the contact surface when curving the reflection film into the cavity.

The fixing may be performed by clamping the reflection film between a pressure area on the injection side and a pressure area of the movable parts of the injection mold on the contact side. The pressure areas can be formed as areas of movable parts of the reflection mold. When closing the mold, the pressure areas can be moved towards each other and thus fix the reflection film. The fixing can be performed such that a continuous flow or a continuous slipping movement of the reflection film is enabled or controlled between a pressure area on the injection side and a pressure area on the contact side. To this end, the pressure areas may circumferentially be located in a distance from the contact surface such that the reflection film may flow within the pressure areas from outside the peripheral area of the contact surface into the are within the peripheral areas of the contact surface. By this kind of flowing or sipping movement of the reflection film, an uneven or unwanted stretching or elongation of the reflection film may be reduced or avoided in the region of the contact surface.

According to a modification of the method, the step of providing a reflection film may be performed by providing a reflection film with a carrier material of a polymer material which at least in part mats together with the Injected polymer material during the reflection molding process behind the reflection film with the polymer material.

According to one further modification of the method, the method may be embodied as a continuous or semi-continuous method such that several reflector body segments are successively produced, wherein after each step of injection molding a further area of a continuously provided reflection film material is supplied to the cavity.

The continuously provided reflection film material can be provided in the form of a strip which is gradually supplied after each injection such that in the cavity, a new section of the film may be provided for the next injection step.

A third aspect relates to a method of producing a reflector body segment, in particular a reflector body segment for the production of a spherical retro-reflective marker, in a forming process, for example in a blow molding process, a deep-drawing process or in a similar process, comprising the steps of:
  applying a reflection film onto a carrier layer,
  providing a forming mold with a forming surface which defines the forming mold in an area,
  providing the carrier layer together with the reflection film applied thereon next to the forming surface,
  plastically forming the carrier layer together with the reflection film applied thereon until the carrier layer together with the reflection film applied thereon has substantially taken the form of the forming surface on one side.

A reflector body segment of this type as well can form together with additional reflector body segments a reflector body, in particular for a spherical retro-reflective marker. In particular, the method is suitable for producing reflector body segments for a reflector body according to the first aspect. The method may also be used for producing other types of reflector body segments, for example hemispherical ones, for other types of markers. Is also conceivable that a reflector body segment produced in this way is used without further segments as a single-piece marker with only one segment.

According to the third aspect for example reflector body segments may be produced where no reference surface areas has—compared to any other reference surface area—a relative difference reflection of less than 85%. The most weakly reflecting areas can thus still reach a difference reflection value of 85% of the best reflecting area. Depending on the design of the reflector body segments, difference reflection values of 87%, 90% or even difference reflection values above these values may be reached.

The forming surface may be configured as a contact surface, as has been described above with respect to the other aspects. The forming surface can also be provided on the side of the carrier layer as a core forming surface of a core form, the core forming surface being provided with a convex shape, in particular a hemispherical raised portion. The core forming surface may have a size which is reduced by the thickness of the reflector body segment to be produced.

In addition to the core forming surface, a cavity may be provided on the side of the reflection surface, the cavity having a contact surface, as has been described above with respect to the second aspect. It is also conceivable that the forming surface is provided only on the side of the carrier layer without any additional contact surface on the side of the reflection surface.

The plastic deformation can be performed by applying pressure on the side opposing the contact surface of the carrier layer and/or by applying a negative pressure on the side of the contact surface.

Additionally or as an alternative to applying pressure/negative pressure, the step of plastically forming may be performed by pressing in the core form on the side of the carrier layer opposite to the reflection surface.

If in addition to the core form the contact surface is provided, pressing in the core form may be performed such that the reflection surface is brought into contact with the contact surface.

The plastic deformation may be enhanced by heating the carrier layer.

For example, the reflection film may comprise a carrier material with micro-spheres arranged thereon. Here, as noted above, the term carrier material differs from the term "primary carrier layer as well as from the term "carrier layer". The term carrier layer" refers to a separate layer onto which the reflection film comprising the carrier material may be applied. The carrier layer may be an essentially self-supporting and rigid layer which is formed together with the reflection film and then keeps its shape until further processing or under conditions of use of the reflector body. A carrier layer of this type onto which the reflection film is applied, may for example be a PVC layer (layer of polyvinyl chloride) with a thickness of 0.2 mm to 4 mm. The primary carrier layer may also consist of a different material. Further processing refers for example to applying the formed reflector body segment onto a carrier body or injection molding in an injection molding process according to the second aspect.

Moreover, reference is made to the other aspects, in particular to the second aspect from which other possibilities for configuring the method can be deduced.

Note that the carrier layer may have areas of different yield strengths such that the composite of the reflection film has areas of different yield strengths as well. Areas having different yield strengths of the carrier layer may, as has previously been described with respect to the carrier material, be generated by different material thicknesses of the carrier layer. It is also possible that areas of different yield strengths are generated from a combination of different material thicknesses or material properties of the carrier layer and the carrier material.

Several reflector body segments produced in this way may be assembled to a retro-reflective marker. To this end, the reflector body segments may be applied to a solid base body for example by bonding or the like.

It is also conceivable that a reflector body segment of this type may further be processed by injection molding to a reflector body segment in the sense of the second aspect and the reflector body segments are subsequently assembled to a retro-reflective marker. A reflector body segment in the sense of this third aspect can therefore be an intermediate product for a reflector body segment in the sense of the second aspect.

Further modifications and procedures concerning the method of producing a reflector body segment in a forming process result in an analogous manner from the above-described injection molding process.

A fourth aspect relates to a reflector body segment, in particular a reflector body segment having a sphere segment-shaped retro-reflective reflection surface, the segment produced by a method according to the second or third aspect.

A reflector body segment of this type can also be a semi-spherical reflector body segment. According to the process described, depending on the design of the shape of the reflector body segment, a lower absolute elongation of the reflection film can be achieved than with previously known coating methods for markers. Regardless of the shape of the reflector body segment, a more uniform elongation distribution at different points of the reflector body segment may be achieved than with previously known coating methods for markers.

Reflector body segments which are produced according to the methods described here, can therefore have reflection properties which differ from those of markers produced according to conventional coating methods. In addition, the reflector body segments which are produced according to the methods described here are cheaper than conventionally coated markers.

A fifth aspect relates to a method of producing a reflector body, comprising the steps of:
producing a reflector body segment by a method according to the second or third aspect and
assembling the reflector body segments to a reflector body.

The reflector body segments with the coating may be connected to each other by welding (for example ultrasonic welding), bonding, form-fitting or friction-fitting or the like. It is also conceivable, especially with respect to reflector body segments which were produced according to the third aspect that the reflector body segments are applied onto a carrier body, for example onto a spherical carrier body. The carrier body may for example comprise the adapter receptacle. It is also conceivable that a plurality of reflector body segments, especially the reflector body segments which were produced according to the third aspect, are injection molded or molded according to a different casting method together and thus form the reflector body.

A sixth aspect relates to a reflector body, in particular a spherical retro-reflective marker, which is produced by a method according to the fifth aspect.

BRIEF DESCRIPTION OF THE FIGURES

In the drawings:

FIGS. 7a to 7d show various stages of a third method of producing a reflector body segment.

FIGS. 8a to 8d show various stages of a fourth method of producing a reflector body segment.

FIGS. 10a to 10d show various images of the surface of a retro-reflective body from prior art.

FIGS. 12a to 12d show images of a conventional marker, the images taken by the measurement system shown in FIG. 11.

FIGS. 13a to 13d show images of a marker which was produced by a method according to FIGS. 7 and 8, the images taken by the measurement system shown in FIG. 11.

DETAILED DESCRIPTION OF THE FIGURES

In the following, several embodiments will be described in detail by way of example with reference to the figures. Here, the individual embodiments described may have features which are not required for the claimed subject matter, but which provide desired properties in certain applications.

As disclosed and falling under the technical teachings of this document embodiments are likewise considered which do not have al the features of the embodiments described below. Furthermore, in order to avoid unnecessary repetitions, only certain features are described with respect to specific embodiments. It should be noted that the individual embodiments should therefore not be taken per as but should also be considered in a synopsis. Based on this synopsis, a person skilled in the art will recognize that individual embodiments may be modified by including one or more features from other embodiments.

It should be noted that a systematic combination of various embodiments with one or more features which are described with respect to other embodiments, may be desirable and useful and should therefore be considered as comprised in the description.

With respect to the various embodiments, for reasons of clarity, similar components are denoted with the same reference numbers. To avoid repetitions, only the distinguishing features compared to other embodiments are described in detail, whenever those features make the technical teachings clear.

Figure 1:
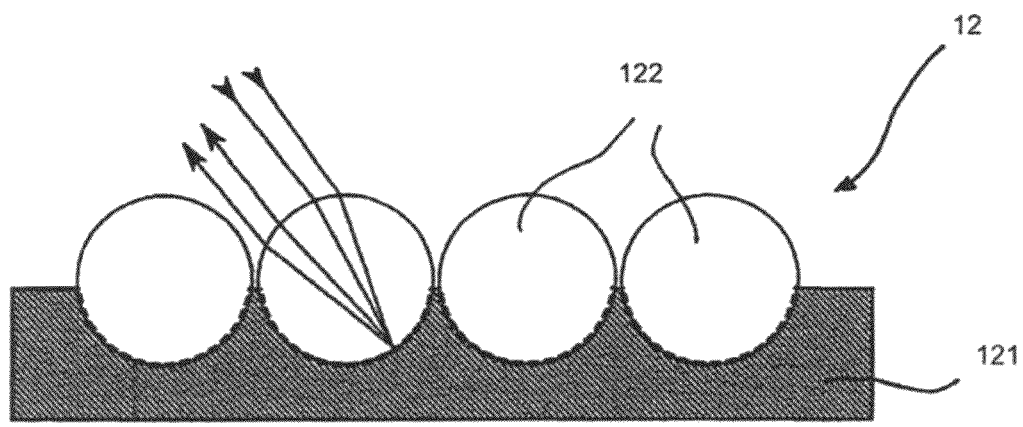
FIG. 1 shows a reflection film for coating a reflector body segment.

FIG. 1 shows a schematic view of a reflection film which can be used as a reflection film 12 for costing a reflector body segment. The retro-reflection of micro-spheres 122 is shown. Another name for the micro-spheres 122 is micro-balls. The micro-spheres 122 may for example have a diameter of about 40 µm to 100 µm.

In contrast to the diffuse reflection from a surface, as it is shown in the figure, the incident light rays are reflected substantially in parallel at a surface of a retro-reflection film such that they are reflected back to the light source which means that they are retro-reflected. To this end, the micro-spheres 122 may be coated with a reflection layer on the side opposite to the light rays. Regardless of the angle of incidence, reflection is possible up to a limiting angle where the illustrated spheres overlap each other.

Apart from the micro-spheres 122, retro-reflective surfaces can be realized in different ways, for example on retro-reflectors of plane mirrors or flat surfaces. Here, a distinction is made for example with respect to designs having two or three mutually perpendicular reflecting planes. Designs having three reflection planes are for example referred to as triple mirrors. As a triple prism a glass body is referred to which is plane in the front and has at its rear side three nonreflecting plane surfaces which are oriented to each other under an angle of 90°.

The description below is limited to reflection films 12 with micro-spheres 122 which are applied to a carrier material 121 as part of the reflection film 12.

Reflection films 12 of this type are available in various models from various produces on the market, for example under the trade name Scotchlite from 3M.

The carrier materials 121 of the reflection films 12 of this type may for example be textile carrier materials, carrier materials with one homogeneous layer (for example a polymer film) or other carrier materials. Reflection fins 121 may be configured as self-adhesive, for example they may have a coating of an adhesive material. On the carrier material 121, the reflector elements, for example the micro-spheres 122, may be placed.

Figure 2:
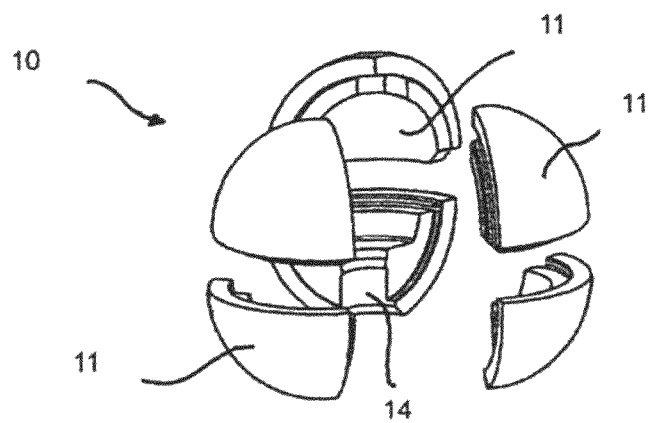
FIG. 2 shows a first embodiment of a reflector body which comprises six different reflector body segments.
Figure 9A:
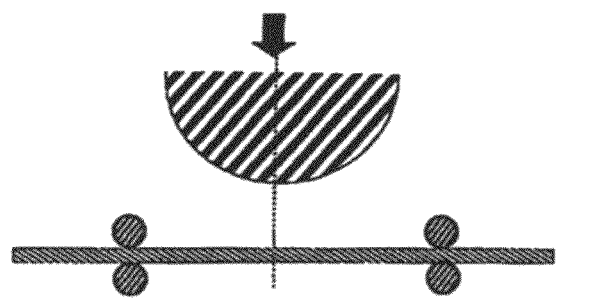
FIGS. 9a to 9e show various steps of a method of coating a hemisphere with a reflection film.
Figure 9B:
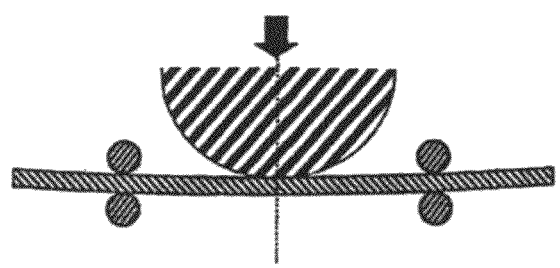
Figure 9C:
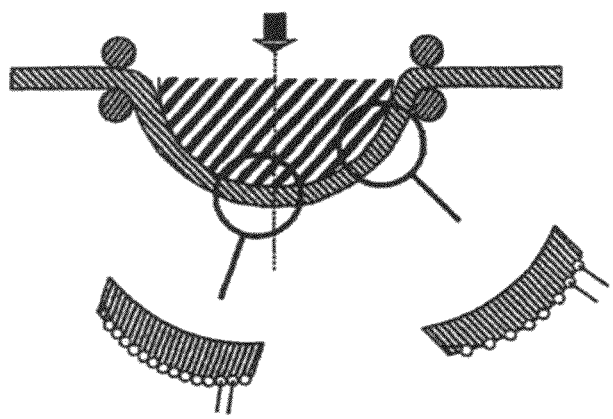
Figures 9D, 9E:
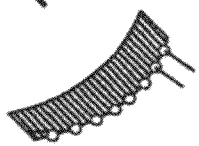

FIG. 2 shows a first embodiment of a reflector body 10 in an exploded view. The reflector body 10 has six different reflector body segments some of which are by way of example denoted with reference number 11. In the illustrated reflector body 10, several or al of the illustrated reflector body segments 11 may have a coating which comprises a reflection film 12, as it is shown for example in FIG. 1. The various reflector body segments 11 may be produced according to one of the methods described in this document. It is also conceivable that one or more of the shown reflector body segments 11 are produced using a method as it is schematically shown in FIGS. 9a to 9c. Here, a different stretching or elongation of different film areas can be achieved, as it is shown in FIGS. 9d and 9e. The difference in elongation may however be reduced due to the described geometrical design of the reflector body segments 11 as desired. The desired reflection properties of the reflector body segments 11 and the reflector body 10 can be achieved by using a method of the described type.

It can be seen from FIG. 2 that three of the reflector body segments 11 can be put together to form a hemispherical element 111, with two such hemispherical elements 111 in turn forming a spherical shape and thus forming the reflector body 10. Here, the three reflector body segments 11 which are shown in the top part of the figure, have a substantially identical design. The three reflector body segments 11 shown in FIG. 2 are substantially identical as well; in contrast to the upper three reflector body segments 11, they each comprise however a recess, the recesses forming together an adapter receptacle 14 in the composite reflector body 10. Near their assembling edges, the individual reflector body segments 11 have a geometrical design which could allow a form-fitting when assembling the reflector body segments 11. The reflector body segments 11 may additionally or alternatively be bonded or welded or otherwise connected to each other.

In this embodiment it is also conceivable that one of the hemispherical elements 111 is only formed by one or more reflector body segments 11 while the other hemispherical element 111 is formed by two or more reflector body segments 11.

Figure 3:
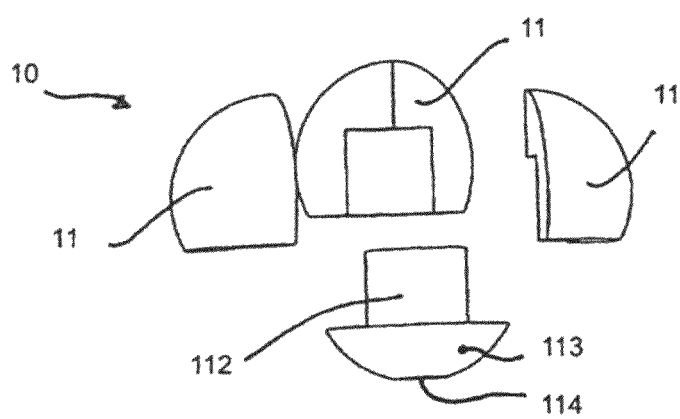
FIG. 3 shows a second embodiment of a reflector body which comprises four different reflector body segments.

FIG. 3 shows a second embodiment of a reflector body 10 which comprises four different reflector body segments 11. In this embodiment, the three reflector body segments which are shown in the top part of the figure again have a substantially identical design. Furthermore in this embodiment, a sphere segment-shaped base segment 112 is provided onto which the other three reflector body segments 11 may be applied. As is apparent from FIG. 3, the term "sphere segment-shaped" base segment 112 means a reflector body segment 11, the reflection surface 113 of which substantially corresponds to the surface of a spherical segment—ignoring the area of the adapter receptacle 14.

The sphere segment-shaped area of the base segment 112 can, as it is shown in this embodiment, be smaller than a hemisphere such that the rest of the reflector body segments 11 forms a part of a spherical surface, the part being larger than a hemisphere. In a modification of this embodiment, it is also conceivable that the base segment 112 with the adapter receptacle 14 has a hemispherical surface wherein the rest of the reflector body segments 11 forms a hemispherical surface.

In this embodiment, it is also conceivable that in addition to the base segment 112 only two reflector body segments 11 or more than three reflector body segments 11 are provided.

The base segment 112 has a substantially cylindrical holding portion which corresponds to partially cylindrical recesses of the other reflector body segments 11 such that the reflector body segments 11 can be applied easily to the base segment 112, as it has been described above with respect to FIG. 2.

Figure 4:
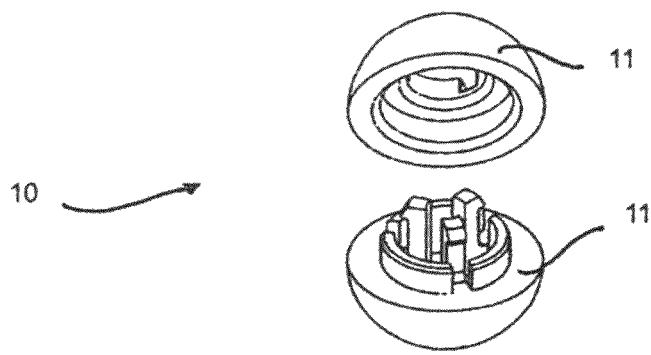
FIG. 4 shows a third embodiment of a reflector body which comprises two different reflector body segments which were produced according to one of the methods described here.

FIG. 4 shows a third embodiment of a reflector body 10 which comprises two different reflector body segments 11 which are produced according to one of the methods described in this document, for example using an injection molding process.

By using one of these methods which will be described hereinafter in detail, a desired reflection property of the reflector body segments 11 can be achieved by suitably configuring the production method such that a multi-part design of a reflector body 10 as it has been described above is superfluous. It is also conceivable however that a reflector body 10 with more than two reflector body segments 11 may be produced using the corresponding production methods.

In the reflector body 10 which is shown in FIG. 4, two reflector body segments 11 are provided which can be connected using a clip closure. One of the two reflector body segments 11 may have an adapter receptacle which is not designated in this figure.

FIGS. 5a to 5d illustrate various stages of a first method of producing a reflector body segment 11.

As shown in FIGS. 5a to 5d, an injection mold 30 is provided which comprises a contact element 31 with a contact surface 32 and an opposing element with an injection orifice 35. The contact surface 32 defines a region of a cavity 34 into which an injection molding material 301 may be injected in the injection molding process. The area defined by the contact surface 32 may substantially correspond to the reflection surface 113 of the reflector body segment to be produced.

Figure 5A:
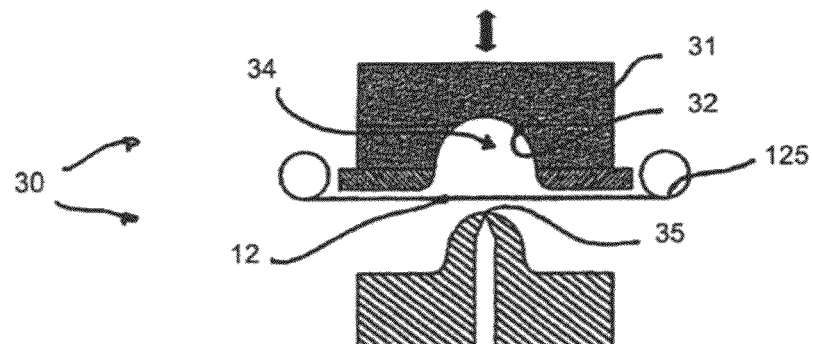
FIGS. 5a to 5d show various stages of a first method of producing a reflector body segment.

FIG. 5a shows the injection mold 30 in a position in which the contact element 31 and the opposite element are moved apart. It is evident from the figure that the reflection film 12 is provided in the form of a continuously provided reflection film material 125 between the contact element 31 and the injection orifice 35.

Figure 5B:
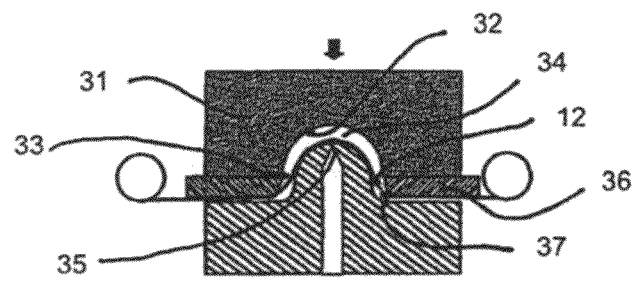

As it is shown in FIG. 5b, the contact element 31 and the opposing element are moved towards each other such that the cavity 34 in which the reflection film 12 is provided is a closed cavity which on one side opposite to the injection orifice 35 at least in part is limited by the contact surface 32. Adjacent to a peripheral area 33 of the contact surface 32, an edge element 36 is provided which in the present embodiment is embodied as a two-part edge element 36. Near the edge portion 33, the edge element 36 has a rounded edge 37 which may surround the contact surface 32 circumferentially in the peripheral area 33.

When closing the injection mold 30, in the illustrated embodiment the portion of the injection mold which is opposite to the contact surface 32 is pressed into the refection film 12 such that the film is pre-stretched. Here, the film can continuously flow from the outside over the rounded edge 37.

Figure 5C:
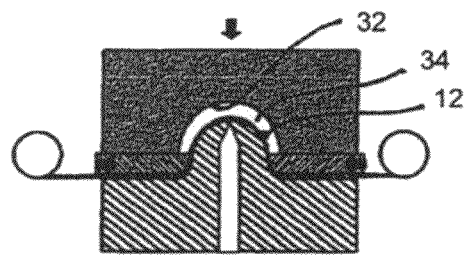

FIG. 5c shows that the two-part edge element 36 was retracted in the direction of the injection orifice 35 such that the areas of the edge element 36 with the rounded edge 37 advanced over the edge area 33 of the contact surface 32. In this position, in the transition zone between the rounded edge 37 and the surface area of the edge element 36 which in this position limits a portion of the cavity 34, a sharp edge is formed at which the reflection film 12 may be torn off during the injection of the molding material 301 into the cavity 34.

Figure 5D:
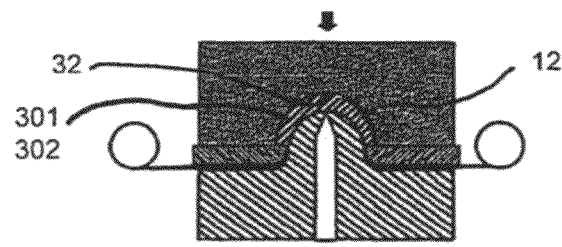

In a next method step, the molding material is injected through the injection orifice 35 behind the reflection film 12 into the cavity 34 such that the reflection film 12 is "inflated" and thus brought into contact with the contact surface 32, as it is shown in FIG. 5d. During injection of the injection molding material 301, the reflection film 12 may show a substantially uniform deformation depending on the properties of the carrier material 121 such that the reflection film 12 is stretched uniformly over the entire range of the reflection surface.

FIGS. 6a to 6d show various stages of a second method of producing a reflector body segment 11, the method being essentially the same as just described. The device used for performing the method likewise essentially corresponds to the device which was described with respect to the first method. To avoid unnecessary repetitions, mainly the distinguishing features with respect to the first method will be described.

A first distinguishing feature of the device shown in FIGS. 6a to 6d is—compared to the device shown in FIGS. 5a to 5d—that the edge element 36 is a single-piece element in the device shown in FIGS. 6a to 6d, for example in the form of a continuous ring which extends around the contact surface 32. The edge element 36 of the device shown in FIGS. 6a to 6d comprises two or more parts and may be puled apart to an ejection position in a direction which can be described as a lateral direction with respect to FIGS. 5a to 5d, and can be closed to an injection position. In contrast to this, the edge element 36 which can be used in the device shown in FIGS. 6a to 6d, can be shifted from an injection position of the contact element 31 into an ejection position. In the injection position as it is shown in FIG. 6, the edge element 36 is in contact with the contact element 31 and the rounded edge 37 of the edge element 36 can be arranged around the peripheral area 33 of the contact element 31, the area extending around the contact surface 32 of the contact element 31. Here, the sharp edge of the edge element 36 may slightly protrude inward from the peripheral area 33 of the contact surface 32 such that the reflection film 12 may be torn or cut off at this edge during the injection process.

From the injection position, the edge element 36 may be moved into the ejection position where the edge element 36 is spaced from the contact element 31. In the ejection position, the distance between the edge element 36 and the contact element 31 may be as large that the molded part 302 fits between the edge element 36 and the contact element 31 during ejection.

Figure 6A:
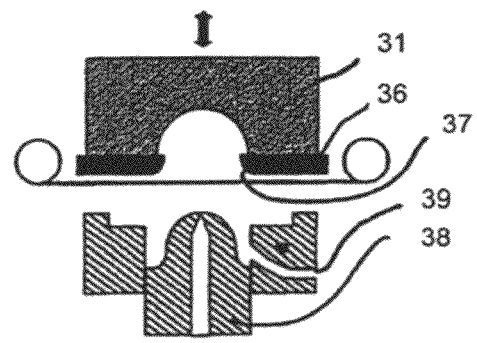
FIGS. 6a to 6d show various stages of a second method of producing a reflector body segment.
Figure 6B:
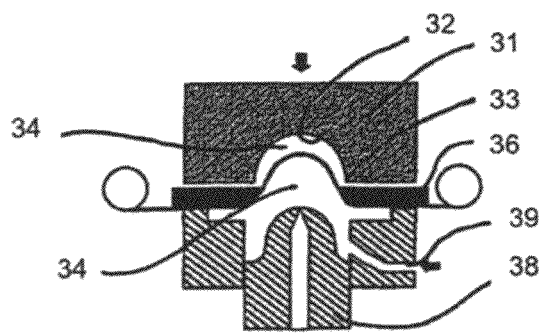

Another distinguishing feature of the injection device is that the part of the injection mold which is opposite to the contact element 31, is designed with a movable core area 38 such that the injection mold 30 can be dosed without the core area 38 penetrating into the reflection film 12. Furthermore, the injection mold 30 comprises an air duct 39 on the injection side through which air may be blown into the injection-side area of the cavity 34 such that the reflection film 12 curves toward the contact surface 32. In order to allow that the air which is between the reflection film 12 and the contact surface 32, can escape from the contact-side area of the cavity 34, a gap between the edge element 36 and the contact element 31 may be left open while air is blown in, as it is shown in FIG. 6b. Subsequently, the core area 38 may be moved forward in the direction of the contact surface 32 into the injection position.

Figure 6C:
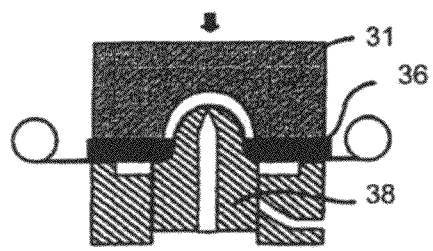
Figure 6D:
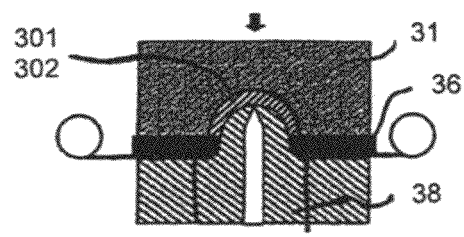

Blowing in air can be described such that the reflection film 12 is brought into contact with the contact surface 32. It is also conceivable that the reflection film 12 is preformed only, as it is shown in FIGS. 6b and 6c such that only when injecting the molding material 301, the film is finally brought into contact with the contact surface 32 of the contact element 31, at is shown in FIG. 6d.

Blowing in air for stretching or pre-stretching the reflection film 12 causes a remarkable uniform elongation of the reflection film 12.

FIGS. 7a to 7d show various stages of a third method of producing a reflector body segment 11. FIGS. 8a to 8d show various stages of a fourth method of producing a reflector body segment 11.

Both methods show different stages of a forming process, which are essentially identical such that they am described together with respect to their differences.

In a first method step, the reflection film 12 with the carrier material 121 described in FIG. 1 and not illustrated in FIGS. 7a to 8d is applied to a carrier layer 131 or a primary carrier layer 132 for example.

The carrier layer 131 or the primary carrier layer 132 differ only in that the carrier layer 131 has self-supporting properties wherein the material and the thickness of the layer are selected such that the layers which were formed together, are rigid in the end. The primary carrier layer 132 may remain flexible also after the forming step and may be designed such that it provides desired stretching properties in conjunction with the reflection film 12. A composite of a reflection film 12 and a flexible primary carrier layer 132 may therefore require a further processing step, for example injection molding or bonding to a carrier body.

In order to apply the reflection film 12 to the carrier layer 131 or the primary carrier layer 132, the reflection film 12 may be provided with an adhesive layer. It is also conceivable that an adhesive is separately applied to the reflection film 12 and/or the carrier material 121 and/for that by heating the carrier material 121 or the carrier layer 131 are in pert liquefied and compressed by force in the liquid state. When applying the reflection film 12 to the carrier layer 131, the two layers may be pressed together for example by means of two heated rollers.

The layers connected in this way can be formed in one further step by means of a forming method.

To this end, a forming mold 40 may be provided which comprises a forming surface. The forming surface may be configured as a contact surface 32 similar to the above-described injection molding process and/or as a core forming surface 42 of a core mold 43.

In a two-piece forming mold 40, as it is shown in FIGS. 7b and 7c, the forming step may be performed by closing the forming mold 40. It is also conceivable that a one-piece forming mold 40 is provided, as it is shown in FIGS. 8b and 8c. In this case, the forming step may be realized by applying a negative pressure on the side of the one-piece forming mold 40 and/or by applying an excess pressure on the opposite side of the two layers.

The forming step may be assisted by heating the layers in order to reach the desired change in viscosity of the carrier layer 131 or the primary carrier layer 132.

In FIGS. 7d and 8d, the two connected layers are shown in the formed state.

In a further step which is not shown, the reflector body segments 11 produced in this way may be separated from the rest of the layers. It is also conceivable that the layers are inserted into an injection mold 30 in their deformed state and are additionally injection molded.

Furthermore, it is conceivable that the formed reflector body segments 11 are for example manually applied to a carrier body.

Figure 11:
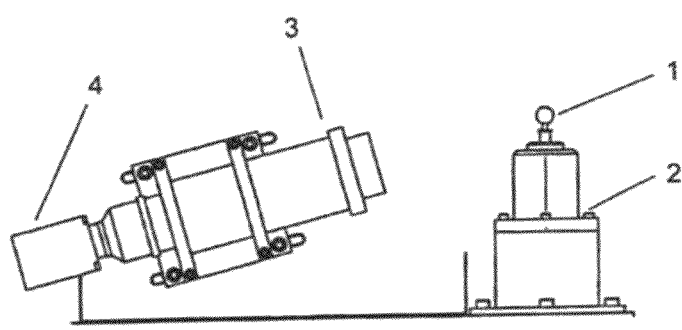
FIG. 11 shows a measurement system for checking the reflection properties of a reflector body, particularly of a spherical retro-reflective marker.

The measurement system shown in FIG. 11 has already been described in the introductory part of the description. With this measurement system, the photographs of the reflector body were taken which are shown in figure series 13.

The reflector body which is shown in figure series 13 was produced by a process which broadly corresponds to the method which is shown in FIGS. 7a, 7b and 7c or 8a, 8b and 8c. Accordingly, the reflector body segments were first produced and then the reflector body segments were assembled to form a reflector body.

The reflector body segments were produced by the steps of
applying a reflection film 12 to a primary carrier layer 131, 132,
providing a forming mold 40 with a forming surface 42 which defines the forming mold 40 in an area,
providing the primary carrier layer 131, 132 together with the reflection film 12 applied thereon next to the forming surface 42,
plastically forming the carrier layer 131, 132 together with the reflection film 12 applied thereon until the carrier layer 131, 132 together with the reflection film 12 applied thereon has substantially taken the form of the forming surface 42.

The primary carrier layer 131, 132 to which the reflection film was applied was in this case a PVC layer with a thickness of 0.15 mm. Other thicknesses am also possible.

According to this method, the forming mold 40 and the forming surface 42 were provided each in the form of hemispherical carrier bodies which mainly corresponded to those which are depicted in FIG. 4. By means of these carrier bodies acting as a forming surface, the primary carrier layer 131, 132 and the reflection film 12 applied thereon were formed. During the forming process, the primary carrier layer 131, 132 was firmly connected by bonding to the hemispherical carrier body. The hemispherical carrier bodies were thus part of the reflector body segment 11 and of the finished reflector body 10. After the forming step, the reflection film 12 together with the primary carrier layer 131, 132 onto which the film was applied, was cut off along the edges of the carrier body, in this example, along the equatorial line.

Subsequently, the two reflector body segments were assembled to a reflector body 10.

The reflection properties of one of the reflector bodies produced in this way in the form of a spherical retro-reflective marker were subsequently checked by the measurement system which has been described with reference to FIG. 11.

The recordings were evaluated by a machine vision software in reel time. The corresponding measurements were based on the CIE standard 054.2-2001.

In the measurements carried out on the reflector bodies of figure series 13, a circular measurement point was defined by using a diameter, the point corresponding to the reference surface area R. The reference surface area R has a diameter equal to about one-eighth of the diameter of the marker.

Figure series 13 shows photographs and excerpts from photographs which were taken of the produced reflector body by using the described measurement system.

FIG. 13a shows a photograph of a maker where the recording direction was directed to an equatorial area of the marker. The optical axis of the CCD camera 4 with the telecentric lens 3—the axis being directed to the spherical center of the marker—intersects, as has been described in the introductory pert with respect to FIG. 12a—the sphere surface—in the illustrated photograph in the equatorial area slightly off the equator. Reference is made to the explanations of figure series 12 concerning the measurement system and the way of carrying out the measurement.

The equator itself is illustrated in FIG. 13a as a thin dark line which is formed significantly thinner than that of the marker of FIG. 12a.

Therefore, the production method described guarantees considerably smaller producing tolerances also with respect to the assembling area between the hemispheres, leading to a narrower joint line along which no retro-reflective surface may be provided. This also leads to a more uniform overall reflection with respect to different viewing directions.

FIG. 13b shows a photograph of a marker where the recording direction was directed towards one pole region of the marker. FIG. 13c shows a magnification of the reference surface area R from FIG. 13a. FIG. 13d shows a magnification of the reference surface area R of FIG. 13b.

The brightness values of the reference surface area R from figure series 13 were identified. It was determined that the CIL in $cd/lux/m^2$ of the reference surface area R in the equatorial region was only 10% below the CIL in $cd/lux/m^2$ of the reference surface area R in the pole region and was thus significantly better compared to the values of the marker from figure series 12.

Further improvements of the CIL ratio may be obtained when one further method of the methods described here is used or if the production method described in the present specific case for the reflector body 10 of FIG. 13 is modified accordingly, such as by injection molding of a formed composite of the primary carrier layer 131, 132 end the reflection film 12 applied thereon and/or by producing the reflector body 10 from three or more reflector body segments 11.

LIST OF REFERENCE NUMBERS 1 measurement object
2 socket
3 lens with lighting unit
4 CCD camera
10 reflector body
11 reflector body segment
111 Hemispherical element
112 basis segment
113 reflection surface
12 reflection film
121 carrier material
122 micro-spheres
125 reflection film material
131 carrier layer
132 primary carrier layer
14 adapter receptacle
30 injection mold
301 injection molding material
302 injection-molded part
31 contact element
32 contact surface
33 peripheral area
34 cavity
35 injection orifice
36 edge element
37 rounded edge
38 core area
39 air duct
40 forming mold
42 core forming surface
43 core form
R reference surface area

The invention claimed is:

1. Reflector body which forms a marker, comprising one or more reflector body segments, wherein each reflector body segment has a coating which comprises a reflection film which, by itself on a single surface, reflects light directly back to a source of said light in a direction substantially parallel to incident light from said source, and producing each reflector body segment in an injection molding process, comprising the steps of:
   providing an injection mold with a contact element, which has a contact surface, which defines a cavity of the injection mold in an area, and an injection orifice,
   injection molding behind the reflection film by injecting a molding material through the injection orifice into the cavity.

2. Reflector body according to claim 1, wherein the reflector body has a substantially spherical reflection surface.

3. Reflector body according to claim 2, wherein the reflector body has two hemispherical elements, wherein one hemispherical element has at least one reflector body segment and the other hemispherical element has at least two reflector body segments.

4. Reflector body according to claim 2, wherein the reflector body has a sphere segment-shaped base segment with an adapter receptacle,
   wherein the base segment has at least one reflector body segment, and
   wherein the reflector body furthermore has at least two further reflector body segments, which together with the sphere segment-shaped base segment form a spherical shape.

5. Reflector body according to claim 1, wherein the reflector body segments are connected to each other by at least one of:
   form-fitting,
   friction-fitting,
   bonding and
   welding.

* * * * *